US008363957B2

(12) United States Patent
He et al.

(10) Patent No.: US 8,363,957 B2
(45) Date of Patent: Jan. 29, 2013

(54) IMAGE CLASSIFICATION SYSTEM AND METHOD THEREOF

(75) Inventors: Xinhua Sam He, Zionsville, IN (US); Clayton L. Nicholas, Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 846 days.

(21) Appl. No.: 12/536,675

(22) Filed: Aug. 6, 2009

(65) Prior Publication Data

US 2011/0033084 A1 Feb. 10, 2011

(51) Int. Cl.
*G06K 9/62* (2006.01)

(52) U.S. Cl. ........ 382/209; 382/103; 382/118; 382/124; 382/224

(58) Field of Classification Search .................. 382/103, 382/118, 154, 218, 224
See application file for complete search history.

(56) References Cited

U.S. PATENT DOCUMENTS

| 5,826,224 | A | 10/1998 | Gerson et al. | |
|---|---|---|---|---|
| 5,859,921 | A | 1/1999 | Suzuki | |
| 6,134,270 | A | 10/2000 | Mou | |
| 6,510,244 | B2 * | 1/2003 | Proesmans et al. | 382/203 |
| 6,671,391 | B1 | 12/2003 | Zhang et al. | |
| 6,964,023 | B2 | 11/2005 | Maes et al. | |
| 7,406,181 | B2 * | 7/2008 | O'Boyle et al. | 382/104 |
| 7,466,755 | B2 | 12/2008 | Chen et al. | |
| 7,508,961 | B2 | 3/2009 | Chen et al. | |
| 7,646,896 | B2 * | 1/2010 | Yukhin et al. | 382/115 |
| 2003/0160970 | A1 * | 8/2003 | Basu et al. | 356/601 |

(Continued)

FOREIGN PATENT DOCUMENTS

| DE | 100551228 | 10/2002 |
|---|---|---|
| EP | 1386786 | 2/2004 |

(Continued)

OTHER PUBLICATIONS

Smith P et al. "Monitoring head/eye motion for driver alertness with one camera" Pattern Recognition, 2000. Proceedings. 15$^{th}$ International Conference on Sep. 3-7, 2000, Los Alamitos, CA, USA, IEEE Comput. Soc, US, vol. 4, Sep. 3, 2000, pp. 636-642, XP010533160 ISBN:0-7695-0750-6 *p. 638, right-hand column, last paragraph* *p. 639, left-hand column, paragraph 1* *p. 641, left-hand column, last paragraph; figures 1-13*.

(Continued)

*Primary Examiner* — Gregory M Desire
(74) *Attorney, Agent, or Firm* — Lawrence D. Hazelton

(57) ABSTRACT

An image classification system configured to classify a target and method thereof is provided, wherein the system includes at least one light source configured to emit light with at least one line pattern towards the target, wherein at least a portion of the emitted light and line pattern is reflected by the target. The system further includes an imager configured to receive at least a portion of the reflected light and line pattern, such that an obtained 2-D line pattern is produced that is representative of at least a portion of the emitted light and line pattern reflected by the target, and a controller configured to compare the 2-D line pattern to at least one previously obtained 2-D line pattern stored in a database, such that the controller classifies the 2-D line pattern as a function of the comparison.

14 Claims, 3 Drawing Sheets

U.S. PATENT DOCUMENTS

| | | | |
|---|---|---|---|
| 2006/0251297 A1 | 11/2006 | Hammoud et al. | |
| 2007/0127787 A1* | 6/2007 | Castleman et al. | 382/118 |
| 2009/0169095 A1* | 7/2009 | Zhuang et al. | 382/154 |
| 2010/0134600 A1* | 6/2010 | McKeon et al. | 348/48 |
| 2011/0033084 A1* | 2/2011 | He et al. | 382/103 |

FOREIGN PATENT DOCUMENTS

| | | |
|---|---|---|
| WO | 02069266 | 9/2002 |

OTHER PUBLICATIONS

Database Inspec [Online] The Institution of Electrical Engineers, Stevenage, GB' 44 Dec. 4, 2003, Smith P et al: "Determining driver visual attention with one camera" XP002404338 Database accession No. 788640 *abstract*-& IEEE Transactions on Intelligent Transportation Systems IEEE USA, vol. 4, No. 4, Dec. 4, 2003; pp. 205-218, XP002411909 ISSN: 1524-9050.

Database WPI Week 200272 Derwent Publications Ltd., London, GB; AN 2002-675082 XP002404344-&, WO 02/*069266 A1 (Setp One Col Ltd) Sep. 6, 2002 *abstract*.

Zhao Jiali et al: "Face recognition: a facial action reconstruction and ICA representation approach" Info-Tech and Info-Net, 2001. Proceedings. ICH 2001-Bejing. 2001 International Conferences on Oct. 29-Nov. 1, 2001, Piscataway, NJ, USA, IEEE, vol. 3, Oct. 29, 2001, ISBN:0-7803-7010-4 *p. 459-p. 460*.

Spors S et al: "A real-time face tracker for color video" 2001 IEEE International Conference on Accoustics, Speech, and Signal Processsing. Proceedings. (ICASSP). Salt Lake City, UT, May 7-11, 2001, IEEE International Conference on Acoustics, Speech, and Signal Processing (ICASSP), New York, NY: IEEE, US, vol. 1 of 6, 7,May 5, 2001, pp. 1493-1496, XP0108029178 ISBN: 0-7803-7041-1 *pp. 1494, right-hand column, paragraph 2.4—p. 1494, last line*.

Acosta E et al:"An automatic face detection and recognition system for video indexing applications" 2002 IEEE International Conference on Accoustics, Speech, and Signal Processing Proceedings. (ICASSP). Orlando, FL, May 13-17, 2002, IEEE International Conference on Accoustics, Speech, and Signal Procesing (ICASSP), New York, NE: IEEE, US, vol. 4 of 4, May 13, 2002, pp. IV-3644, XP 010804390 ISBN: 0-7803-7402-9 *p. 3646*.

Said, et al. (A New, Fast, and Efficient Image Codec Based on Set of Partitioning in Hierarchical Trees, Jun. 1996, IEEE Transactions on Circuits and Systems for Video Technology, vol. 6, No. 3, pp. 243-250.

* cited by examiner

IMAGE CLASSIFICATION SYSTEM AND METHOD THEREOF

FIELD OF THE INVENTION

The present invention generally relates to an image classification system and method thereof, and more particularly, to an image classification system and method thereof of that obtains and classifies an image of a target.

BACKGROUND OF THE INVENTION

Many products and systems in the market today for human being identification are generally based upon the analysis of images which are taken from a subject. The process requires high quality of an image of the subject in order to meet the performance requirements of the task. That also means a need for a high computing power for data processing. Variations from environmental conditions and others always impact on the image quality and subsequence upon the system performance.

In another area of applications, generally, a primary task when operating a vehicle, such as, driving an automobile, flying a plane, or conducting a train, is to monitor vehicular movement to ensure safe passage of the vehicle and its contents. At times, however, a vehicle operator can become distracted. Some common distractions include fatigue, talking on or dialing a phone, interacting with passengers, or reading road signs.

Systems have been proposed, wherein devices periodically or randomly require an operator to manually respond to an awareness indicator by pressing a button. If a response is not received, the device generates an alarm altering the operator of potential danger. Other proposed devices attempt to monitor driver awareness based on heart metrics. For example, the device may measure fluctuations in heart rate, blood pressure, or irregular heart beat patterns. While these attempts, allegedly, increase driver awareness during times of fatigue, they are crude measures that are susceptible to false signals.

Other previous systems have included an imager that takes a detailed image of the vehicle driver, and attempts to recognize facial points on the driver in the image, such as eyes, ears, nose, or mouth. Based upon the location of these facial features, the system can determine whether the driver of the vehicle is attentive or non-attentive. These systems typically require large amounts of processing capability to determine the location of the facial features contained in the image.

SUMMARY OF THE INVENTION

In accordance with one aspect of the present invention, an image classification system configured to classify a target includes at least one light source configured to emit light towards the target, wherein at least a portion of the emitted light is reflected by the target. The image classification system further includes an imager in optical communication with the at least one light source, wherein the imager is configured to receive at least a portion of the reflected light, such that a two-dimensional (2-D) line pattern is produced that is representative of at least a portion of the emitted light reflected by the target, and a database configured to store at least one previously obtained 2-D line pattern. Additionally, the image classification system includes a controller communicatively connected to the imager, wherein the controller is configured to compare the 2-D line pattern to the at least one previously obtained 2-D line pattern stored in the database, such that the controller classifies the 2-D line pattern as a function of the comparison.

According to another aspect of the present invention, an image classification system configured to classify an awareness of an occupant of a vehicle includes at least one light source configured to emit light towards the occupant, wherein at least a portion of the emitted light is reflected by the occupant. The image classification system further includes an imager in optical communication with the at least one light source, wherein the imager is configured to receive at least a portion of the reflected light, such that a two-dimensional (2-D) facial fingerprint is produced that is representative of at least a portion of the emitted light reflected by the occupant, and a database configured to store at least one previously obtained 2-D facial fingerprint. Additionally, the image classification system includes a controller communicatively connected to the imager, wherein the controller is configured to compare the 2-D facial fingerprint to the at least one previously obtained 2-D facial fingerprint stored in the database, such that the controller classifies the occupant as one of a forward facing classification, a rightward facing classification, a leftward facing classification, a downward classification, an attentive classification, and a non-attentive classification.

According to yet another aspect of the present invention, a method of classifying the target in an image includes the steps of illuminating the target, obtaining an image based upon at least a portion of light reflected by the illumination of the target, wherein the image is a two-dimensional (2-D) line pattern that is representative of at least a portion of the light reflected by the target, comparing the 2-D line pattern to at least one previously obtained 2-D line pattern, and classifying the target in the image based upon the comparison of the 2-D line pattern and the obtained 2-D line pattern.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF EMBODIMENTS

Figure 1:
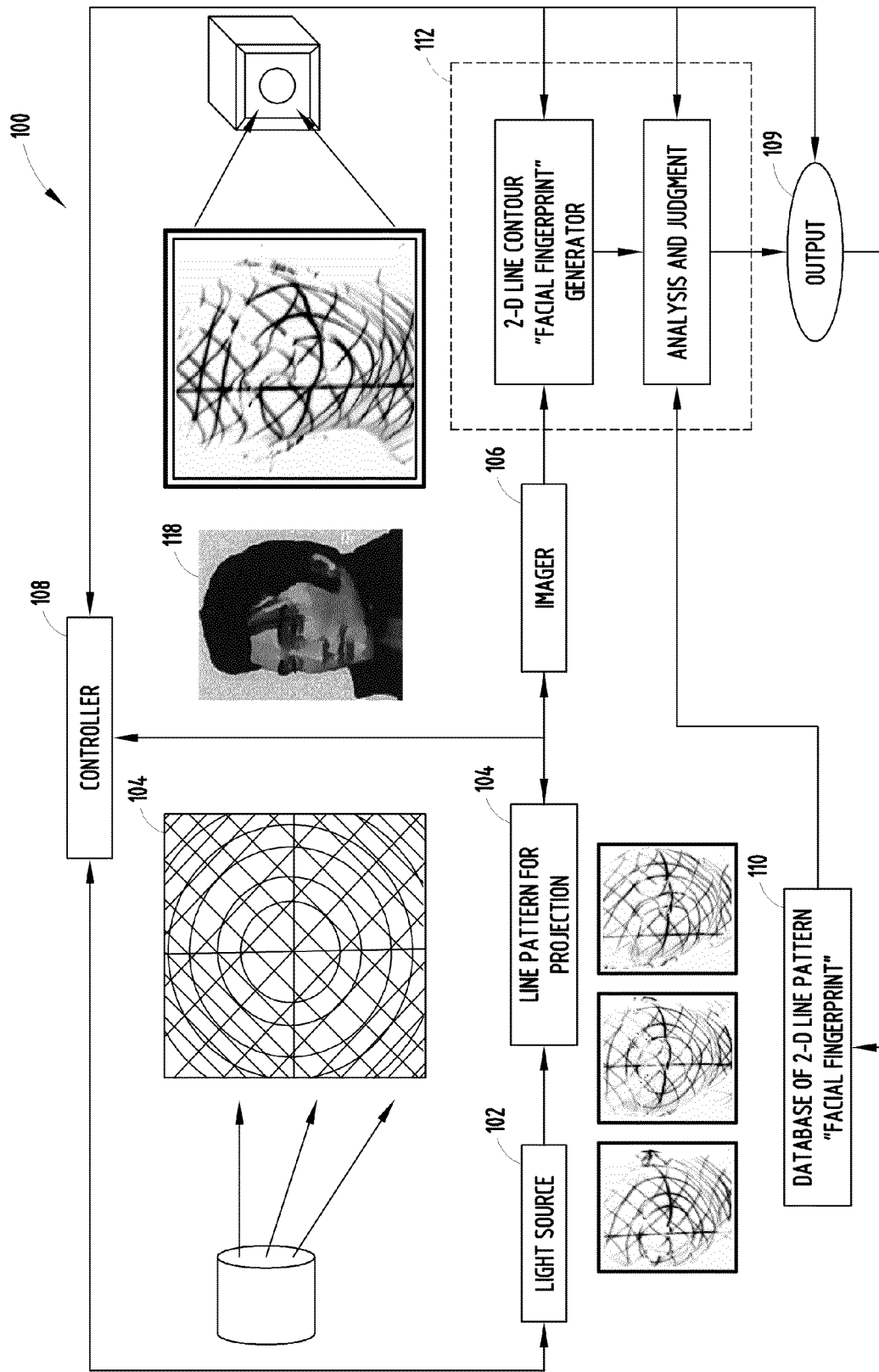
FIG. 1 is a block diagram of an image classification system, in accordance with one embodiment of the present invention.

In regards to FIG. 1, an image classification system configured to classify a target is generally shown at reference identifier 100. According to one embodiment, the image classification system 100 can be configured to classify an awareness of an occupant of a vehicle. The image classification system 100 includes at least one light source 102 configured to emit a light pattern 104 towards a target 118, wherein at least a portion of the emitted light is reflected by the target 118. The image classification system 100 further includes an imager 106 in optical communication with the at least one light source 102, wherein the imager 106 is configured to receive at least a portion of the reflected light such that a dimensional (2-D) line pattern 116 is produced that is representative of at least a portion of the emitted light reflected by the target 118. Further, the image classification system 100 includes a database 110 configured to store at least one previously obtained 2-D line pattern, and a data processor 112 communicatively connected to the imager 106, wherein the data processor 112 is configured to compare the 2-D line pattern 116 to the at least one previously obtained 2-D line pattern stored in the database 110, such that the data processor 112 classifies the 2-D line pattern 116 as a function of the comparison, as described in greater detail herein.

According to one embodiment, in regards to FIG. 1, an image classification system 100 can be configured to identify a human being subject (e.g., the target 118). The image classification system 100 can include the at least one light source 102 configured to emit the light pattern 104 towards the target 118, wherein at least a portion of the emitted light pattern 104 is reflected by the target 118. The image classification system 100 further includes the imager 106 in optical communication with the at least one light source 102, wherein the imager 106 is configured to receive at least a portion of the reflected light such that an obtained 2-D line pattern 116 is produced that is representative of at least a portion of the emitted light reflected by the target 118. The image classification system 100 further includes a data processor 112, wherein the 2-D line contour image, (e.g., a facial fingerprint) is analyzed and classification is made. Further, the image classification system 100 can include the database 110 configured to store at least one previously obtained 2-D line pattern, and the controller 108 communicatively connected to the imager 106 and the data processor 112, wherein the data processor 112 is configured to compare the 2-D line pattern to the at least one previously obtained 2-D line pattern stored in the database 110, such that the data processor 112 classifies the 2-D line pattern to identify a human being subject as a function of the comparison.

Thus, the image classification system 100 can be used in a vehicle to identify and classify an occupant of the vehicle, such as, but not limited to, a driver, according to one embodiment. When the occupant of the vehicle is positively identified, a proper level of accesses to the vehicle can be granted to the occupant accordingly (e.g., anti-theft protection).

The image classification system 100 can be used in a vehicle to identify and classify the status of an occupant of the vehicle, such as, but not limited to, a driver, according to one embodiment. By classifying the driver of the vehicle, the image classification system 100 can determine if the driver is attentive or non-attentive (e.g., looking forward or not looking forward, respectively). Further, by using the 2-D line pattern 116, the data bytes that are processed by the data processor 112 are reduced, as compared to processing a more detailed image. The image classification system 100 can emit an output 109 based upon the determined classification of the target in the obtained image. According to one embodiment, the output 109 can be an audio output, a visual output, a mechanical vibration, the like, or a combination thereof.

According to one embodiment, the 2-D line pattern is a facial fingerprint, such that the target 118 is at least a portion of a face of a user of the image classification system 100. Typically, the user of the image classification system 100 can be a driver of the vehicle. However, it should be appreciated by those skilled in the art that the target or user of the image classification system 100 can be any object, human being, living being, the like, or a combination thereof, wherein it is desirable to image and classify a position and/or movement of the target or user. The classification of the facial fingerprint can be one of a full-registered user, a partial-registered user, a non-registered user, the like, or a combination thereof. Typically, a full-registered user can be a user that had facial fingerprints imaged and stored in the database 110 prior to use of the image classification system 100, a partial-registered user is a user that is imaged so that the facial fingerprints can be stored in the database 110 during use of the image classification system 100, and a non-registered user is a user who is classified as a non-access operator.

According to one embodiment, the 2-D line pattern is a facial fingerprint, such that the target 118 is at least a portion of a face of a user of the image classification system 100. Typically, the user of the image classification system 100 can be a driver of the vehicle. However, it should be appreciated by those skilled in the art that the target or user of the image classification system 100 can be any object, human being, living being, the like, or a combination thereof, wherein it is desirable to image and classify a position and/or movement of the target or user. The classification of the facial fingerprint can be one of a forward facing classification, a rightward facing classification, a leftward facing classification, an upward facing classification, a downward facing classification, an attentive classification, a non-attentive classification, the like, or a combination thereof. Typically, the forward facing classification identifies the user as being attentive (e.g., looking out a windshield in a forward direction of a vehicle), and the rightward, leftward, upward, and downward facing classifications, or combinations thereof, identify the user as being non-attentive (e.g., not looking out a windshield in a forward direction of a vehicle).

The emitted light can have a wavelength in the non-visible wavelength spectrum, according to one embodiment. In such an embodiment, the light source 102 can be an infrared light source. However, it should be appreciated that light at other non-visible wavelengths, visible wavelengths, or a combination thereof, can be emitted from the light source 102. It should further be appreciated by those skilled in the art that suitable filters or the like can be used with the light source 102, the imager 106, or a combination thereof. Additionally or alternatively, the at least one light source 102 can be a plurality of light sources, and at least a portion of the plurality of light sources 102 can be configured to emit light at different wavelengths.

As illustrated in FIG. 1, the light source 102 can emit the light in a predetermined line pattern. Exemplary light source patterns can include straight lines, circles, angles of emitted light rays with respect to the light source 102 and/or the target 118, spacing of emitted light rays, the like, or a combination thereof. The structure of the lines can include various width of lines, dot and/or solid lines, the like, or a combination thereof. The predetermined line patterns can be generated through a hardware component, such as, but not limited to, an optical lens, or the like, a software component, such as, but not limited to a data processor, a controller, or the like, or a combination of the hardware components and software components. The type of imager 106 can be based upon the type of light source 102 that is included in the image classification system 100, such as, but not limited to, a complimentary metal-oxide semiconductor (CMOS) imager, a charged coupled device (CCD) imager, the like, or a combination thereof.

The image classification system 100 can further include a 2-D line pattern generator, also known as the data processor 112, in communicative connection with the imager 106, wherein the imager 106 is configured to obtain an image of the target 118, and the 2-D line pattern generator 112 can be configured to produce the 2-D line pattern as a function of the obtained image, according to one embodiment. Thus, the imager 106 obtains a more detailed image of the target 118, and the 2-D line pattern generator 112 produces the 2-D line pattern that has less data bytes than the image obtained by the imager 106 of the target 118. In such an embodiment, the 2-D line pattern generator 112 can be integrated with the controller 108, as illustrated in FIG. 1, or the 2-D line pattern generator 112 can be a device separate from the controller 108. Alternatively, the 2-D line pattern generator 112 can be integrated with the imager 106. Alternatively, the 2-D line pattern database 110 can be integrated with the imager 106, the 2-D line pattern database 110 can be integrated with the controller 108, the 2-D line pattern database 110 can be a device separate from the controller 108, or a combination thereof. It should be appreciated by those skilled in the art that these and other integrations, such as, but not limited to, the light source 102, the imager 106, the controller 108, the database 110, and the data processor 112 can be integrated or otherwise combined in various combinations.

According to an alternate embodiment, the light source 102 emits the light in a 2-D line pattern 104, such that at least a portion of the emitted 2-D line pattern light is reflected by the target 118. The imager 106 can then receive at least a portion of the reflected 2-D line pattern light. The received reflected 2-D line pattern light can then be compared to the at least one previously obtained 2-D line pattern stored in the database 110. In such an embodiment, the received reflected 2-D line pattern light received by the imager 106 can have a reduced amount of data bytes than a more detailed image of the target 118.

Figure 2E:
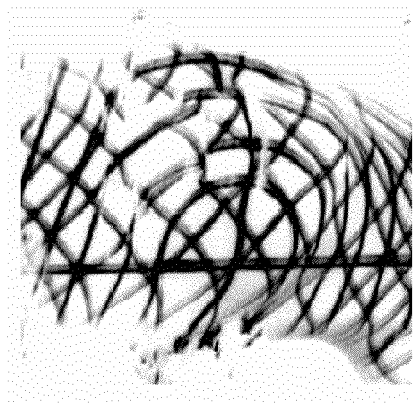
FIGS. 2E and 2F are exemplary illustrations of a 2-D line pattern of a facial target facing rightward, in accordance with one embodiment of the present invention.
Figure 2F:
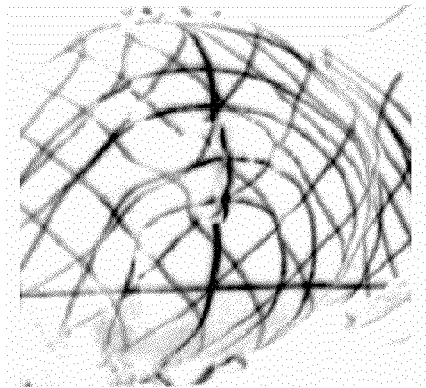
Figure 2C:
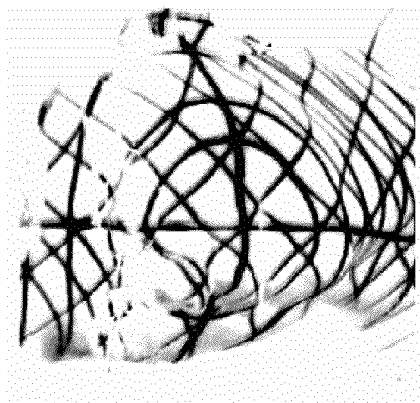
FIGS. 2C and 2D are exemplary illustrations of a 2-D line pattern of a facial target facing forward, in accordance with one embodiment of the present invention.
Figure 2D:
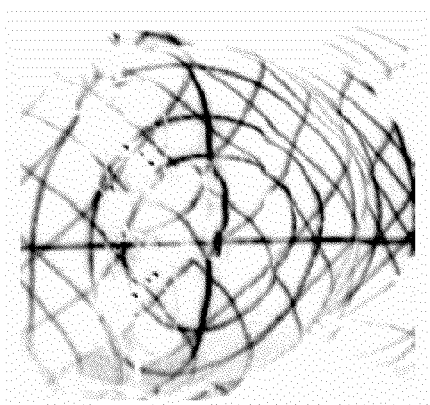
Figure 2A:
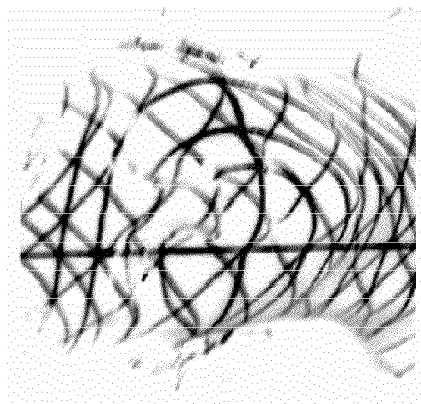
FIGS. 2A and 2B are exemplary illustrations of a 2-D line pattern of a facial target facing leftward, in accordance with one embodiment of the present invention.
Figure 2B:
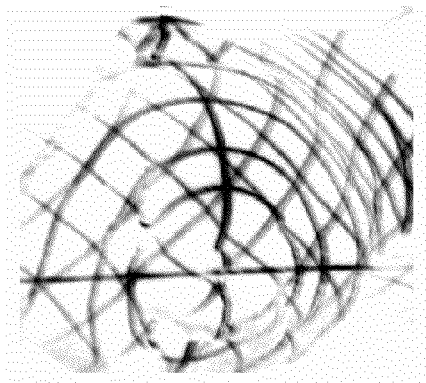

Exemplary 2-D line pattern images, also known as facial fingerprints, are illustrated in FIGS. 2A-2F, wherein the 2-D line pattern images represent 2-D facial fingerprints. Thus, the 2-D line pattern images can be images of a face of a user of an image classification system 100, according to one embodiment. Exemplary 2-D facial fingerprints of a user of the image classification system 100 looking leftward are shown in FIGS. 2A and 2B. Exemplary 2-D facial fingerprints of a user of the image classification system 100 looking forward are shown in FIGS. 2C and 2D. Exemplary 2-D facial fingerprints of a user of the image classification system 100 looking rightward are shown in FIGS. 2E and 2F.

According to one embodiment, the database 110 can include a memory device configured to store one or more previously obtained 2-D line pattern images. Typically, previously obtained 2-D line pattern images can include 2-D line pattern images that are obtained and classified in a manufacturing or assembly setting (e.g., a laboratory), 2-D line pattern images obtained during use of the image classification system 100, or a combination thereof. Thus, in an embodiment, wherein the image classification system 100 is configured to store obtained 2-D line pattern images during operation, the image classification system 100 can obtain 2-D line pattern images specific to users of the image classification system 100 that are likely to be regular or continuous users of the image classification system 100 (e.g., a driver of a vehicle being an owner of the vehicle). Further, the image classification system 100 can be configured for dynamic analysis, such as, but not limited to, determining motion of the target 118 (e.g., a direction of movement, a speed of movement, the like, or a combination thereof).

Figure 3:
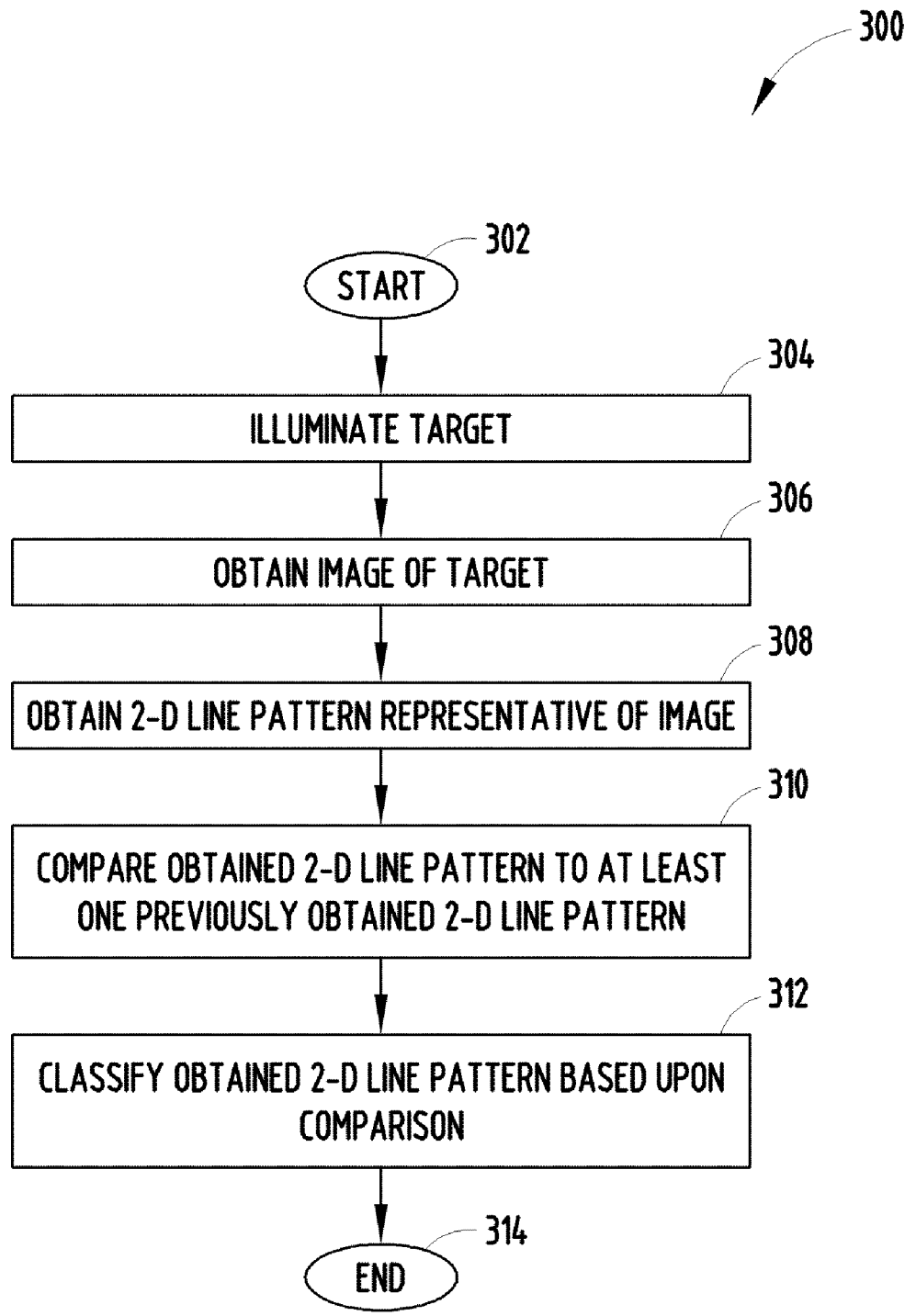
FIG. 3 is a flowchart illustrating a method of classifying the target in an image, in accordance with one embodiment of the present invention.

In regards to FIGS. 1 and 3 a method of classifying the target 118 in an image is generally shown in FIG. 3 at reference identifier 300. The method 300 starts at step 302, and proceeds to step 304, wherein a target 118 is illuminated. Typically, the target 118 is illuminated by the light source 102. According to one embodiment, the light source 102 emits light in a predetermined line pattern. At step 306, an image of the target 118 is obtained. At step 308, a 2-D line pattern image, known as facial fingerprint, that is representative of the image is obtained. Typically, the 2-D line pattern generator 112 produces a 2-D line pattern representative of the image obtained by the imager 106, such that the 2-D line pattern image has a reduced number of data bytes as compared to the image originally obtained by the imager 106. Additionally or alternatively, the 2-D line pattern has less data bytes than a more detailed image of the target 118.

The method 300 then proceeds to step 310, wherein the obtained 2-D line pattern image, known as facial fingerprint, is compared to at least one previously obtained 2-D line pattern. Typically, the previously obtained 2-D line pattern images, known as facial fingerprints, are stored in the database 110. According to one embodiment, a reduced amount of processing is needed to compare the obtained 2-D line pattern image, known as facial fingerprint, to one or more line pattern images, known as facial fingerprints, stored in the database 110, then if the image obtained by the imager 106 was being compared to non-2-D line pattern images having a greater number of data bytes than the 2-D line pattern image, known as facial fingerprint. Thus, the comparison can be based upon line positioning, contour of the lines forming the 2-D line pattern, weight of lines, line angles, parameters of lines, parameters of the 2-D line pattern image, the like, or a combination thereof, and not all of the pixels of the image.

At step 312 the obtained 2-D line pattern image is classified based upon a comparison, and the method 300 then ends at step 314. It should be appreciated that the method 300 can continuously repeat, as illustrated in FIG. 3, such that the method 300 proceeds from step 312 to return to step 304. Typically, the method 300 can continue to repeat until power is turned off to the image classification system 100, such as, but not limited to a vehicle being turned off.

Advantageously, the image classification system 100 and the method 300 obtain a 2-D line pattern of a target, which has less data bytes than a more detailed image obtained by the imager 106. Thus, due to the reduced number of data bytes in the 2-D line pattern not needing to process each pixel of an image, or a combination thereof, the processing capabilities of the image classification system 100 can be reduced. Additionally or alternatively, the memory size needed in the database 110 can be reduced when the database 110 stores previously obtained 2-D line patterns rather than more detailed images. It should be appreciated by those skilled in the art that additional or alternative advantages may be present based upon the image classification system 100 and/or the method 300. It should further be appreciated by those skilled in the art that the above described components can be combined in alternative ways that may not be explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An image classification system configured to classify a target comprising:
   at least one light source configured to emit light towards the target, wherein at least a portion of said emitted light is reflected by the target;
   an imager in optical communication with said at least one light source, wherein said imager is configured to receive at least a portion of said reflected light, such that a two-dimensional (2-D) line pattern is produced that is representative of at least a portion of said emitted light reflected by the target;
   a database configured to store at least one previously obtained 2-D line pattern; and
   a controller communicatively connected to said imager, wherein said controller is configured to compare said 2-D line pattern to said at least one previously obtained 2-D line pattern stored in said database, such that said controller classifies said 2-D line pattern as a function of said comparison, wherein said obtained 2-D line pattern is a facial fingerprint, such that the target is at least a portion of a face of a user of the image classification system.

2. The system of claim 1, wherein said at least one light source projects an initial line pattern at the target, such that the target is at least a portion of a face of a user of the image classification system.

3. The system of claim 1, wherein said classification of said facial fingerprint is one of a full-registered user, a partial-registered user, and a non-registered user.

4. The system of claim 1, wherein said classification of said facial fingerprint is one of a forward facing classification, a rightward facing classification, leftward facing classification, an upward classification, a downward classification, an attentive classification, and a non-attentive classification.

5. The system of claim 1, wherein said 2-D line pattern has parameters of a 2-D line pattern image.

6. The system of claim 1, wherein said at least one light source is a plurality of light sources, and at least a portion of said plurality of light sources is configured to emit light at different wavelengths.

7. The system of claim 1 further comprising a 2-D line pattern generator in communicative connection with said imager, wherein said imager is configured to obtain an image of the target, and said 2-D line pattern generator is configured to produce said obtained 2-D line pattern as a function of said obtained image.

8. The system of claim 7, wherein said obtained 2-D line pattern is less data bytes than said image obtained by said imager of the target.

9. The system of claim 1 being used with a vehicle, such that the target is an occupant of said vehicle.

10. An image classification system configured to classify an awareness of an occupant of a vehicle, said system comprising:
    at least one light source configured to emit light towards the occupant, wherein at least a portion of said emitted light is reflected by the occupant;
    an imager in optical communication with said at least one light source, wherein said imager is configured to receive at least a portion of said reflected light, such that a two-dimensional (2-D) facial fingerprint is produced that is representative of at least a portion of said emitted light reflected by the occupant such that the 2-D facial fingerprint has parameters of a 2-D line pattern image;
    a database configured to store at least one previously obtained 2-D facial fingerprint; and
    a controller communicatively connected to said imager, wherein said controller is configured to compare said 2-D facial fingerprint to said at least one previously obtained 2-D facial fingerprint stored in said database, such that said controller classifies the occupant as one of a forward facing classification, a rightward facing classification, a leftward facing classification, an upward classification, a downward classification, an attentive classification, and a non-attentive classification.

11. The system of claim 10, wherein said the light source projects an initial line pattern at the target, such that the target is at least a portion of a face of a user of the image classification system.

12. The system of claim 10, wherein said at least one light source is a plurality of light sources, and at least a portion of said plurality of light sources is configured to emit light at different wavelengths.

13. The system of claim 10 further comprising a 2-D line pattern generator in communicative connection with said imager, wherein said imager is configured to obtain an image of the target, and said 2-D line pattern generator is configured to produce said obtained 2-D line pattern as a function of said obtained image.

14. The system of claim 13, wherein said 2-D line pattern is less data bytes than said image obtained by said imager of the target.

* * * * *